United States Patent
Wong et al.

(10) Patent No.: US 10,218,857 B2
(45) Date of Patent: *Feb. 26, 2019

(54) METERING AND METERING DISPLAY ON COMPUTER FOR WIRELESS ACCESS POINT

(71) Applicant: TracFone Wireless, Inc., Miami, FL (US)

(72) Inventors: Vito Wong, Miami, FL (US); Ming Zhang, Miami, FL (US)

(73) Assignee: TRACFONE WIRELESS, INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,218

(22) Filed: Aug. 14, 2018

(65) Prior Publication Data

US 2019/0007558 A1 Jan. 3, 2019

Related U.S. Application Data

(63) Continuation of application No. 14/994,225, filed on Jan. 13, 2016, now Pat. No. 10,051,134.

(60) Provisional application No. 62/102,860, filed on Jan. 13, 2015.

(51) Int. Cl.
*H04M 15/28* (2006.01)
*H04L 12/14* (2006.01)
*H04M 15/00* (2006.01)

(52) U.S. Cl.
CPC ........ *H04M 15/28* (2013.01); *H04L 12/1435* (2013.01); *H04L 12/1417* (2013.01); *H04L 12/1467* (2013.01); *H04M 15/83* (2013.01); *H04M 15/84* (2013.01); *H04M 15/853* (2013.01); *H04M 15/857* (2013.01)

(58) Field of Classification Search
CPC ....... H04W 12/08; H04W 48/02; H04W 4/26; H04W 84/12; H04W 88/06; H04L 12/2856; H04L 43/04; H04L 43/045; H04L 43/062; H04L 43/0876; H04L 65/1066; H04L 67/10; H04L 67/104; H04M 15/41; H04M 15/58; H04M 15/60; H04M 15/61; H04M 15/80

See application file for complete search history.

(56) References Cited

U.S. PATENT DOCUMENTS

| | | | | |
|---|---|---|---|---|
| 9,232,461 | B2 * | 1/2016 | Sewall | H04L 12/2856 |
| 9,736,320 | B2 * | 8/2017 | Ramprasad | H04L 12/1417 |
| 10,051,134 | B2 * | 8/2018 | Wong | H04M 15/28 |
| 2007/0259670 | A1 * | 11/2007 | Sakhpara | H04W 24/00 455/452.2 |
| 2008/0039102 | A1 * | 2/2008 | Sewall | H04L 12/2856 455/445 |
| 2011/0314145 | A1 * | 12/2011 | Raleigh | H04L 41/0893 709/224 |

(Continued)

*Primary Examiner* — Matthew C Sams
(74) *Attorney, Agent, or Firm* — Baker & Hostetler LLP

(57) ABSTRACT

A process of operating a wireless device and a wireless device operative for obtaining at least one of data usage or an amount of data usage available by a wireless access point with a processor. The process and device further connecting to the wireless access point and transferring data to and from the wireless access point with a transceiver and displaying on a display the at least one of data usage or an amount of data usage available by the wireless access point.

20 Claims, 6 Drawing Sheets

(56) References Cited

U.S. PATENT DOCUMENTS

| | | | | |
|---|---|---|---|---|
| 2013/0196618 A1* | 8/2013 | Zalmanovitch | ....... | H04L 43/045 |
| | | | | 455/405 |
| 2013/0210379 A1* | 8/2013 | Cloutier | ................ | H04W 76/10 |
| | | | | 455/405 |
| 2014/0141744 A1* | 5/2014 | Miluzzo | .................. | H04W 4/08 |
| | | | | 455/406 |
| 2014/0269495 A1* | 9/2014 | Frantz | .................... | H04W 48/18 |
| | | | | 370/328 |
| 2015/0052192 A1* | 2/2015 | Chauhan | ............. | H04L 67/1095 |
| | | | | 709/203 |
| 2016/0057628 A1* | 2/2016 | Sewall | .............. | H04M 1/72527 |
| | | | | 455/406 |
| 2016/0142557 A1* | 5/2016 | Ramprasad | ......... | H04L 12/1417 |
| | | | | 455/406 |
| 2017/0339281 A1* | 11/2017 | Ramprasad | ......... | H04L 12/1417 |

* cited by examiner

METERING AND METERING DISPLAY ON COMPUTER FOR WIRELESS ACCESS POINT

CROSS REFERENCE TO PRIOR APPLICATIONS

This application is a continuation of application Ser. No. 14/994,225, filed Jan. 13, 2016, now U.S. Pat. No. 10,051,134 issued Aug. 14, 2018. This application claims the benefit from U.S. Provisional Application No. 62/102,860 filed on Jan. 13, 2015, which is hereby incorporated by reference for all purposes as if fully set forth herein.

BACKGROUND OF THE DISCLOSURE

1. Field of the Disclosure

The disclosure generally relates to a system that meters an amount of wireless data, on a pre-determined basis, that is exchanged between a wireless network and one or more user devices via the system and displays the amount of data exchanged on one or more user devices.

2. Related Art

Mobile phones and other wireless devices are a popular means for people to connect to the Internet. Wireless devices can access the Internet through a wireless data plan for each wireless device or through a wireless access point, also known as a hotspot. The wireless access point allows one or more devices to access the Internet via a wireless network. The wireless access point using a wireless communication protocol, for example, wireless fidelity (Wi-Fi) between the wireless access point in a Wi-Fi enabled device. The wireless access point subsequently utilizing a wireless communication protocol to connect to a wireless network in order to connect to the Internet. Such wireless access points are popular in homes, coffee shops, and other locations where a person is trying to access the Internet utilizing, for example, using a Wi-Fi compatible device.

Currently, some wireless device users access the Internet through ongoing contracts with a Mobile Network Operator (MNO). In these postpaid plans, wireless device users can purchase a wireless access point and pay a substantial rate per month for data usage in order to have general Internet access via the wireless access point. However, extensive Internet access can result in extremely high costs for users. Moreover, these users are tied to long-term ongoing contracts with the MNO. Either one of these aspects can result in the user being subject to unforeseen expenses.

Alternatively, other users access wireless services through a "prepaid plan." Prepaid plans can be provided to users through a Mobile Virtual Network Operator (MVNO). An MVNO is a mobile operator that typically does not own its own frequency spectrum or have its own network infrastructure. Instead, the MVNOs have business arrangements and contracts with MNOs to purchase data usage of their networks.

In either case, prior network oversight of such wireless access points required extensive and complex tracking and control utilizing back end systems for example. Moreover, a user interested in determining the amount of usage of the wireless access point needed to interact with the network to determine that usage amount.

Accordingly, there is a need for a system and a process for providing a wireless access point that can provide, meter, and control prepaid wireless service along with providing the user with the information related to the same on their device.

SUMMARY OF THE INVENTION

The foregoing needs are met, to a great extent, by this invention, with a system and process for implementing a wireless access point connected to a mobile data network that meters the amount of data transferred between the wireless devices connected to the wireless access point and the mobile data network according to the amount of data a wireless access point user has purchased and displays information regarding the amount of purchased data used and/or remaining for the wireless access point on the user device. Some users may benefit from such a system and method because the invention allows the users to limit and easily know the amount of money they spend accessing the Internet through a mobile data network. Additionally, other users may find it beneficial not to be locked into a long-term contract paying substantial fees per month.

In one or more aspects, a wireless device includes a processor configured to obtain at least one of data usage or an amount of data usage available by a wireless access point, a transceiver configured to connect to the wireless access point and to transfer data to and from the wireless access point, and a display configured to display the at least one of data usage or an amount of data usage available by the wireless access point.

In one or more aspects, a process of operating a wireless device includes obtaining at least one of data usage or an amount of data usage available by a wireless access point with a processor, connecting to the wireless access point and transferring data to and from the wireless access point with a transceiver, and displaying on a display the at least one of data usage or an amount of data usage available by the wireless access point.

There has thus been outlined, rather broadly, certain aspects of the invention in order that the detailed description thereof herein may be better understood and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the invention. It is important, therefore, that the claims be regarded as including such equivalent constructions insofar as they do not depart from the spirit and scope of the invention.

DETAILED DESCRIPTION

Reference in this specification to a "wireless device" is intended to encompass any compatible computing device that can connect to a wireless access point, such as mobile phones, mobile equipment, mobile stations, user equipment, cellular phones, smartphones, handsets or the like (e.g., Apple iPhone, iPad, Google Android-based devices, BlackBerry-based devices, and other types of personal digital assistants or smartphones), wireless dongles, laptops, desktops, or other computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

Further, reference in this specification to a "wireless network" or "network" is intended to encompass any type of wireless network from which an MVNO or an MNO uses to provide wireless data services to a wireless device utilizing a communication channel, such as the Global System for Mobile Communication (GSM) network, Code-Division Multiple Access (CDMA) network, Long Term Evolution (LTE), Evolution-Data Optimized (EVDO), or the like network utilizing a communication channel as defined herein or that may utilize the teachings of the present application to allow a wireless access point to connect to a network operator cloud.

Reference in this specification to "one aspect," "an aspect," "other aspects," "one or more aspects," or the like means that a particular feature, structure, or characteristic described in connection with the aspect is included in at least one aspect of the disclosure. The appearance of, for example, "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
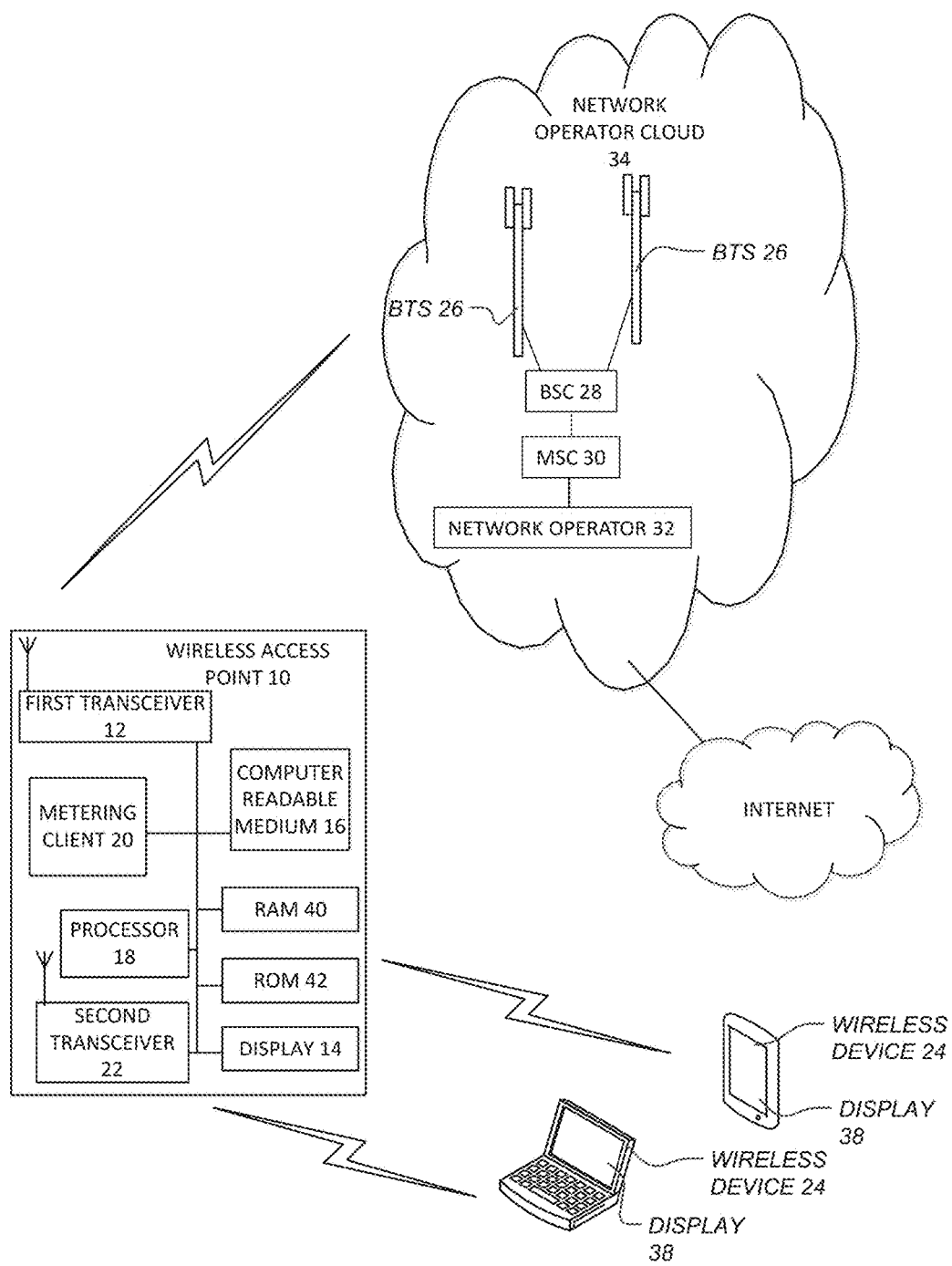
FIG. 1 shows the details of a network operator cloud, a wireless device, a wireless access point, and a metering client configured with the wireless access point according to an aspect of the invention.

FIG. 1 shows the details of a network operator cloud, a wireless device, a wireless access point, and a metering client configured with the wireless access point according to an aspect of the invention. In particular, FIG. 1 shows at least one wireless device 24, a wireless access point 10, and a network operator cloud 34. The wireless device 24 can be, for example, a cellular telephone, a laptop computer, a desktop computer, a tablet, a personal digital assistant, smart phone, or any other device capable of wireless communication such as Wi-Fi wireless communication.

The network operator cloud 34 may include a base transceiver station 26 (BTS), a base station controller 28 (BSC), and a mobile switching center 30 (MSC) overseen by a network operator 32. Other types of networks are contemplated as well.

The wireless access point 10 may include a first transceiver 12, a second transceiver 22, a display 14, a computer readable medium 16, a processor 18, a metering client 20, a random access memory 40, and a read-only memory 42. The first transceiver 12 can include, for example, a wireless antenna and associated circuitry capable of data transmission with the mobile data network utilizing at least one data transmission protocol, such as, for example, 3G, 4G Long Term Evolution (LTE), 5G, Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, combinations thereof, or the like. The first transceiver 12 transmits and receives data over the data transmission protocol with the network operator cloud 34.

The second transceiver 22 transmits to and receives data from the one or more wireless devices 24. The second transceiver 22 can include, for example, a wireless antenna and associated circuitry capable of data transmission over various data transmission protocols, such as, for example, Wi-Fi or some other communication channel as defined herein. The first transceiver 12 and the second transceiver 22 may be configured as separate devices or a single device. The first transceiver 12 and the second transceiver 22 may be configured as separate devices or a single device. The first transceiver 12, the second transceiver 22, and the processor 18 may be configured as separate devices or combined.

In one aspect of the invention, the second transceiver 22 may receive from one or more wireless devices 24, for example, a request to send data to the network operator cloud 34. The second transceiver 22 may receive this request in a modulated signal. The second transceiver 22 then may demodulate this signal for further transmission within the wireless access point 10. The second transceiver 22 formats this message into a protocol appropriate for transmitting data, for example, via a bus on the wireless access point 10. The first transceiver 12 receives this message and modulates the message for further wireless transmission to the network operator cloud 34. The first transceiver 12 formats the message into an appropriate format for transmission to the network operator cloud 34 using a network data transmission protocol as described above, such as, for example, 4G LTE.

In another aspect of the invention, the first transceiver 12 may receive data from the network operator cloud 34 with a destination for one of the wireless devices 24 connected to the wireless access point 10. The first transceiver 12 may demodulate the received message for further data transmission within the wireless access point 10 via, for example, a bus. The first transceiver 12 may format the message from the network operator cloud 34 into a format appropriate on the wireless access point 10. The second transceiver 22 may receive this message. The second transceiver 22 may modulate the received message for further wireless transmission to the wireless device 24. The second transceiver 22 may format the data into a format appropriate for transmission over the wireless protocol the wireless access point 10 is using, such as, for example, Wi-Fi, or some other communication channel as defined herein to communicate with the connected wireless devices 24. In one aspect, the wireless access point 10 may be a single function device providing only wireless access. In another aspect, the wireless access point 10 may be a wireless device such as a smart phone. Other implementations of the wireless access point 10 are contemplated as well.

The wireless device 24 may be configured to display various information provided from the processor 18 of the wireless access point 10, computer readable medium 16, and/or metering client 20. The information may be displayed on a display 38 on the wireless device 24. The information may be provided in a pop-up window, display banner, webpage, menu bar or the like. The displayed information may include, for example, the amount of prepaid wireless data service available, the amount of prepaid time available for using the wireless access point, the network connection strength, the type of mobile network data connection (such as 3G, 4G LTE, 5G, EVDO, etc.) the wireless access point is connected to, and/or other information potentially useful to the user. The information may be displayed simultaneously or the user may interact with an input device such as buttons, mouse, or the like on the wireless device 24 to receive information. For example, the wireless device 24 may display the amount of prepaid wireless data service available, the network connection strength, and the type of mobile network data connection simultaneously. Alternatively, the wireless device 24 may only display one type of information, for example, the amount of prepaid wireless data service available, at a time. The display 38 on the wireless device 24 may then display other types of information if the user interacts with an input device of the wireless device 24. Display of the information on the display 38 may occur in real time. Moreover, the choice of how the display 38 displays the information may be based on a preference designated by the user.

The computer readable medium 16 may be configured to store the metering client 20. For the purposes of this disclosure, computer readable medium 16 stores computer data, which can include computer program code that is executable by the processor 18 of the wireless access point 10, in machine readable form. By way of example, and not limitation, the computer readable medium 16 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 16 or machine readable medium, which may be incorporated into a computer program product. The computer readable medium 16 may also be configured to store the values for the amount of wireless data service available, the amount of wireless data service used, how many days of wireless service have been used, how many days of wireless service remaining, and the like. The computer readable medium 16 may also store how much data was used for each domain, web address, wireless device application, or other web resource during a given time period, such as, for example, one billing cycle.

Additionally, the computer readable medium 16 may communicate to or display on the display 38 on the wireless device 24 the various metrics described above. For example, the computer readable medium 16 may communicate to or display on the display 38 the amount of wireless data service used, the amount of wireless data service remaining, how many days of wireless service have been used, how many days of wireless service remaining, and the like. Similarly, the computer readable medium 16 may also communicate to or display on the display 38 the amount of data sent and received. Moreover, the computer readable medium 16 may communicate to or display on the display 38 the amount of data that may be remaining from the previously purchased and/or credited amount of data.

The processor 18 may be configured to execute the metering client 20. The processor 18 can be, for example, dedicated hardware as defined herein, a computing device as defined herein, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the metering client.

Additionally, the processor 18 may communicate to or display on the display 38 on the wireless device 24 the various metrics described above. For example, the processor 18 may communicate to or display on the display 38 the amount of data used. Similarly, the processor 18 may also communicate to or display on the display 14 the amount of data sent and received. Moreover, the processor 18 may communicate to or display on the display 14 the amount of data that may be remaining from the previously purchased and/or credited amount of data.

The metering client 20 may be a software application configured to track prepaid data usage and the remaining amount of prepaid data available. The metering client 20 may be written in any programming language, such as, for example, C, Java, Objective-C, C#, Python, Visual Basic, Perl, or any other programming language the processor 18 is capable of executing. The metering client 20 may also meter how much data has been used on a given domain, web address, wireless device application, or other web resource.

Additionally, the metering client 20 may communicate to or display on the display 38 on the wireless device 24 the various metrics described above. For example, the metering client 20 may communicate to or display on the display 38 the amount of data used. Similarly, the metering client 20 may also communicate to or display on the display 38 the amount of data sent and received. Moreover, the metering client 20 may communicate to or display on the display 38 the amount of data that may be remaining from the previously purchased and/or credited amount of data.

In a particular aspect of the application, computer readable medium 16 of wireless access point 10 includes the metering client 20. The metering client 20 may be configured to control use of the wireless access point 10 based on interaction with a server, the server provisioning wireless service to the user, or the like. The metering client 20 may utilize an internal accounting module to establish an account with a representation of prepaid funds or available credit for wireless services. The internal accounting module may also store a plurality of charge rates and may also store a billing algorithm. The internal accounting module can classify each wireless service into one of a plurality of billing categories; select a charge rate corresponding to that billing category; calculate an appropriate charge for the data usage in real time by using the selected charge rate; and apply this appropriate charge to the account. Once the internal accounting module determines that the amount of wireless service used has depleted the account zero, the internal accounting module may interact with the processor 18 to limit, prevent, or control further use of the wireless access point 10 as described herein. The controlled use including suspending wireless data service, limiting wireless data service, throttling wireless data service, and allowing all wireless data service. In this aspect, the data management application may also include a module for one or more system provider host processors, which store wireless device identification information; store operating codes needed for wireless device activation; and store operating codes needed for setting prepaid funds or available credit amounts in wireless device accounts whereby, upon receipt of wireless device identification information from a particular wireless device or its user, the host processor may be capable of ascertaining the operating codes needed to activate that particular wireless device or needed to set its account amount. Further details of this aspect of the metering client 20 are described in U.S. Pat. No. 6,650,887, to McGregor, et al., filed Nov. 18, 2003 and incorporated by reference herein in its entirety.

In a further aspect, a display 14 of the wireless access point 10 can be configured to display various information provided to the display 14 from the processor 18 of the wireless access point 10, computer readable medium 16, or metering client 20. The screen may be a cathode ray tube (CRT), a light-emitting diode display (LED), an electroluminescent display (ELD), a plasma display panel (PDP), a liquid crystal display (LCD), an organic light-emitting diode display (OLED), or any other display technology.

The displayed information can include, for example, the amount of prepaid wireless data service available, the amount of prepaid time available for using the wireless access point, the network connection strength, the type of mobile network data connection (such as 3G, 4G LTE, 5G, EVDO, etc.) the wireless access point is connected to, and/or other information potentially useful to the user. The information may be displayed simultaneously or the user may interact with an input device such as buttons on the wireless access point 10 or, if the display 14 is a touch-screen, with the icons on the display 14 to cycle through the various types of information for display. For example, the display 14 may display the amount of prepaid wireless data service available, the network connection strength, and the type of mobile network data connection simultaneously. Alternatively, the display 14 may only display one type of information, for example, the amount of prepaid wireless data service available, at a time. The display 14 may then display other types of information if the user interacts with buttons on the wireless access point 10 or, if the display is a touch-screen, with icons on the display 14.

Figure 2:
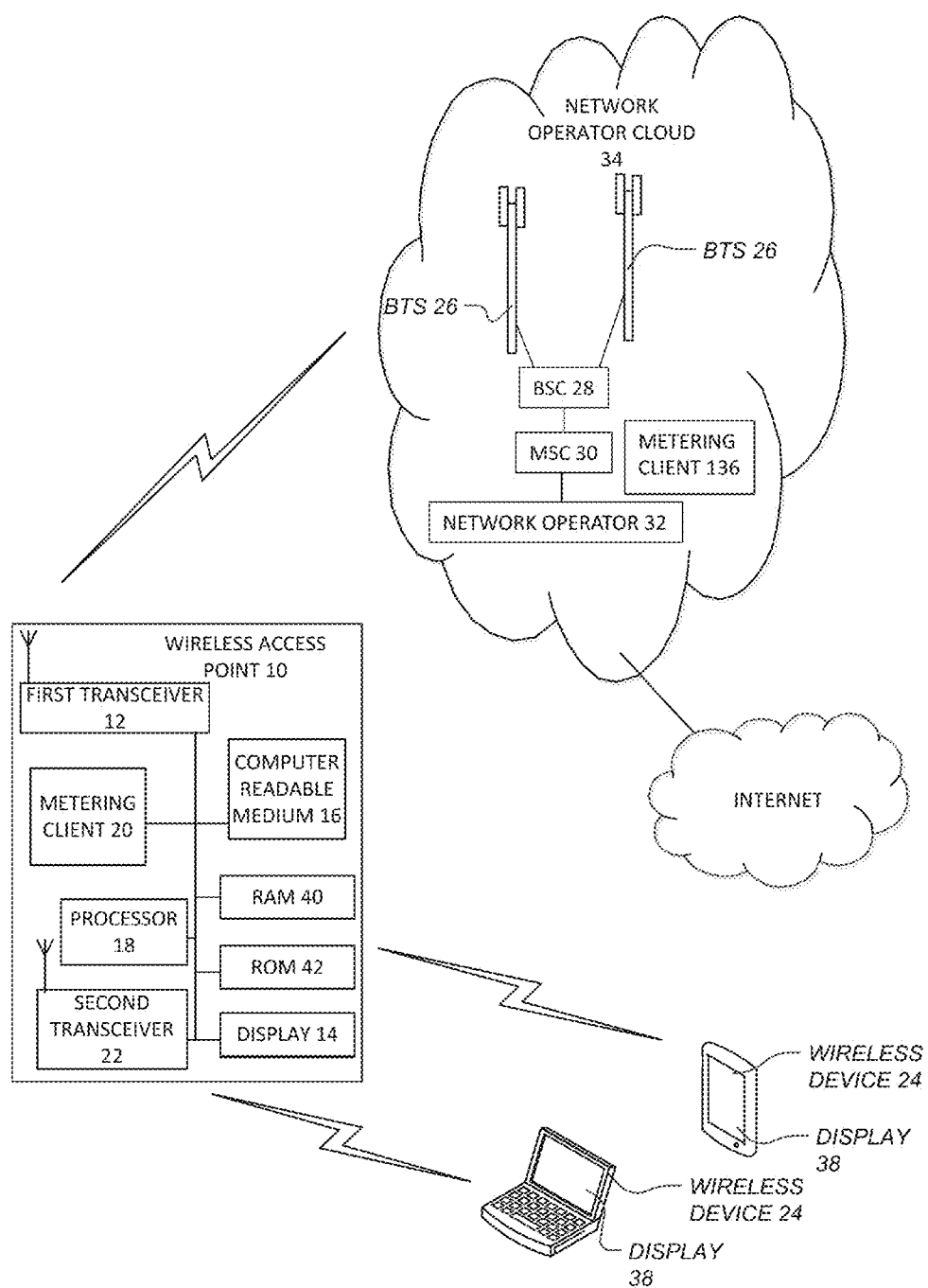
FIG. 2 shows the details of a network operator cloud, a wireless device, a wireless access point, and a metering client configured with the wireless access point and the network operator cloud according to another aspect of the invention.

FIG. 2 shows the details of a network operator cloud, a wireless device, a wireless access point, and a metering client configured with the wireless access point and the network operator cloud according to another aspect of the invention.

This configuration of the metering client achieves the same function as the configuration of the metering client residing completely on the wireless access point 10. The difference between the two configurations is the location in which some of the functions of the metering client may take place. For example, the metering client in the network operator cloud 34 may compute the amount of data used and send that amount to the metering client on the wireless access point 10. The processor 18 would then deduct from the total amount of data available for users the amount of data used as computed by the metering client in the network operator cloud 34. This is only one possible aspect of the different functions the two metering clients 20, 136 may perform. Other functions and division of functions between the two metering clients 20, 136 are possible.

The particular aspect, the metering client 20 may be implemented in conjunction with a metering client that may be implemented as a process capable of tracking usage of a wireless access point 10 in a wireless network with a metering system implemented in a network operator cloud and a tracking system implemented in the wireless access point. The metering client may be capable of activating the wireless access point 10 in response to identification of the wireless device and confirmation of use of a tracking system to the metering system. The metering client may be further configured to obtain by the metering system, an amount of wireless services used by the wireless device; wherein the obtaining includes at least one of obtaining an amount of wireless services used from the third party wireless network and obtaining an amount of wireless services used from the tracking system. With this information, the metering client 20, 136 can interact with the processor 18 to control use of wireless access point 10. The controlled use including suspending wireless data service, limiting wireless data service, throttling wireless data service, and allowing all wireless data service. Further details of this aspect of the metering client are described in U.S. patent application Ser. No. 13/669,838, filed Nov. 6, 2012 and incorporated by reference herein in its entirety. This data management application also allows the user to manage settings and functions of various applications on their wireless access point 10.

Regarding the implementation of the metering client 20 shown in FIG. 1 and the metering client 20, 136 shown in FIG. 2, the metering client 20 is shown implemented within the wireless access point 10. In another aspect, the metering client 20 may be implemented within one designated wireless device 24. The implementation of the metering client 20 within at least one wireless device 24 may be implemented consistent with the description provided herein to provide substantially the same functionality.

Figure 3:
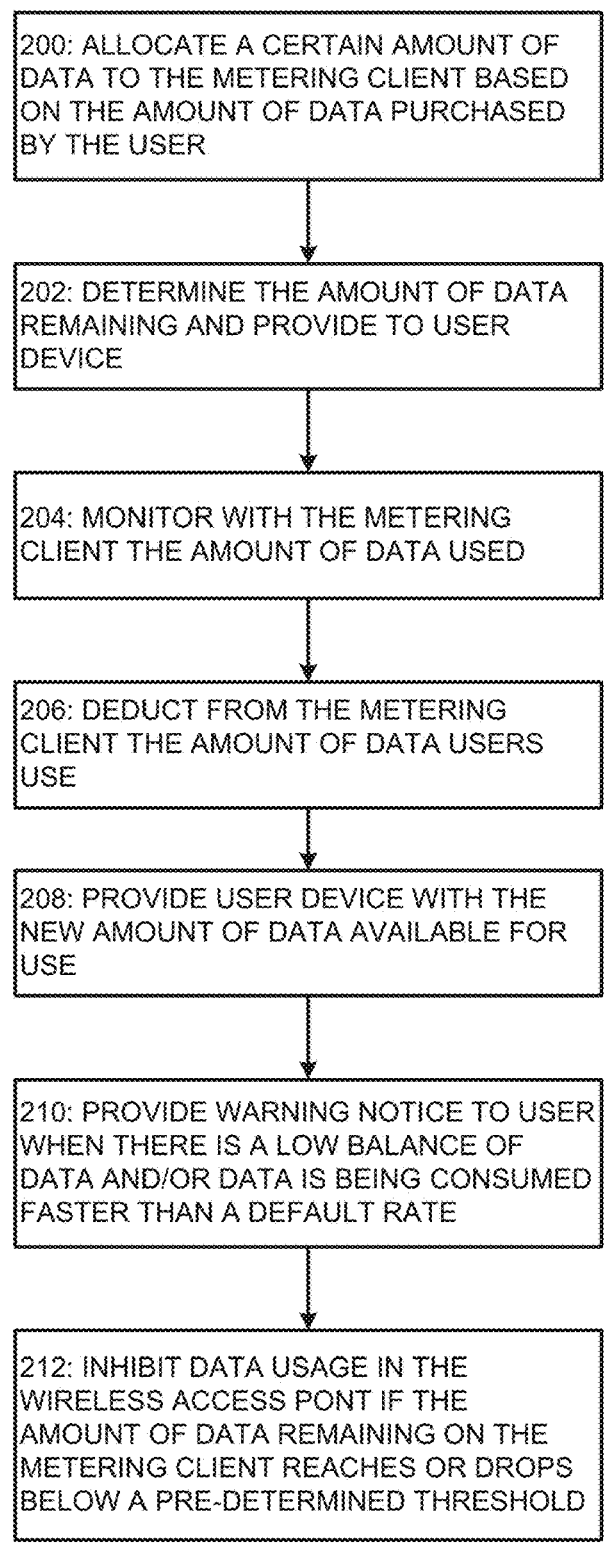
FIG. 3 shows a flowchart detailing the method of how a wireless access point meters the amount of data transferred between one or more wireless devices connected to the wireless access point and the network operator cloud according to yet another aspect of the invention.

FIG. 3 shows a flowchart detailing the method of how a wireless access point meters the amount of data transferred between one or more wireless devices connected to the wireless access point and the network operator cloud according to yet another aspect of the invention. In particular, FIG. 3 shows a method of metering data usage on a wireless access point. In 200, the wireless access point may allocate a certain amount of data to the metering client. The allocation may be determined by how much previously allocated data is still available and then adding to that amount the amount of data purchased by a user.

In 202, the wireless access point may display the total amount of allocated data on the wireless device 24 display 38 so that the user knows how much data is available for use and whether to purchase more data. In 204, while using the wireless access point, the metering client may monitor how much of the allocated data has been used by the at least one wireless device 24 connected to the wireless access point.

In 206, the metering client may deduct from the total amount of allocated data available the amount of data used by the computing devices connected to the wireless access point. In 208, the process may update and display on the display 38 the new remaining amount of data available for use. At 210, the process may provide a warning notice to the user when there is a low balance of data and/or data is being consumed faster than the default rate. The warning notice may be provided in a pop-up window, a display banner, a webpage, a menu bar or the like. In either 208 or 210, the communication between a wireless hotspot and the wireless device 24 may not be subject to metering or airtime charges as such communications are outside the interaction with the network operator cloud 34.

In 212, once the amount of data available for use reaches or drops below a pre-determined threshold, the wireless access point may inhibit data transfer between the wireless access point and the network operator 32.

Regarding the implementation of the process shown in FIG. 3, the process is contemplated as being implemented, at least in part, within the wireless access point 10. In another aspect, the process may be implemented within one designated wireless device 24. The implementation of the process within at least one wireless device 24 may be implemented consistent with the description provided herein to provide substantially the same functionality.

Additionally, the implementation of the process shown in FIG. 3 may be implemented for multiple wireless access points 10. In this regard, the wireless device 24 may poll or receive information from each of the multiple wireless access points 10.

Figure 4:
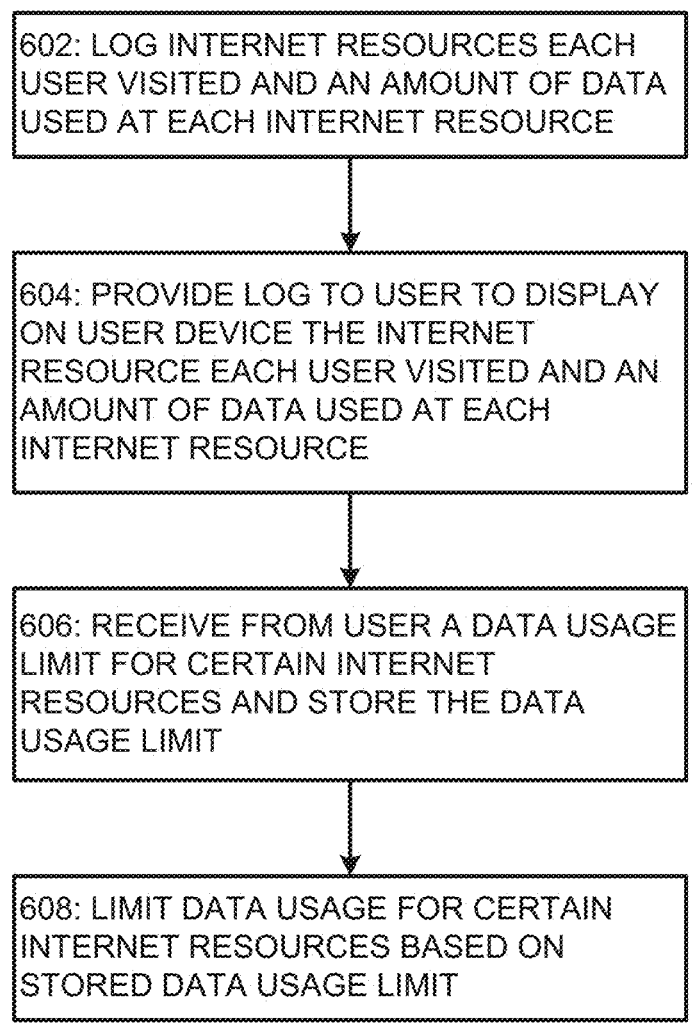
FIG. 4 shows a flowchart detailing a process implemented in the wireless access point according to yet another aspect of the invention.

FIG. 4 shows a flowchart detailing a process implemented in the wireless access point according to yet another aspect of the invention. In particular, the wireless access point 10 utilizing the processor 18 in one aspect may log each Internet resource each user visits and the amount of data used at each Internet resource 602. In particular, the wireless access point 10 may connect to a plurality of wireless devices 24. Each of these wireless devices 24 may utilize the wireless access point to gain access to various Internet resources. For example, the Internet resources may include websites. The processor 18 may log the particular Internet resource that a user of the wireless device 24 attempts to utilize along with the dates of that attempted usage, along with the amount of data utilized in conjunction with the particular Internet resource.

At 604, the wireless access point 10 may provide the log to the wireless device 24. The log may be displayed as a pop-up window, display banner, webpage, menu bar or the like. The log may be displayed periodically, in an ad hoc manner, or as requested by the user of the wireless device 24.

Process 606 may allow a user of a wireless device 24 to provide one or more Internet resources that the wireless access point 10 may inhibit data usage. For example, the user of the wireless device 24 may designate that a particular video streaming website as an Internet resource in which data usage is to be limited. This may be because a video streaming website may typically utilize a higher rate of data usage. The user may designate the particular website and provide a fixed amount of data usage of the wireless access point 10 to that particular Internet resource. The address of the Internet resource and the fixed amount of data usage may be stored in the wireless device 24 and/or the wireless access point 10.

In 608, when a user of the wireless device 24 requests an Internet resource that is stored in the wireless device 24 and/or the wireless access point and as having a fixed amount of data usage, the wireless access point 10 may determine whether the fixed amount of data usage has been exceeded or not. If the fixed amount of data usage has been exceeded, the wireless access point in will inhibit the wireless device from receiving data from that particular Internet resource. On the other hand, if the fixed amount data usage has not been exceeded, the wireless access point 10 may allow the wireless device to receive data from that particular Internet resource.

Regarding the implementation of the process shown in FIG. 4, the process is contemplated as being implemented, at least in part, within the wireless access point 10. In another aspect, the process may be implemented within one designated wireless device 24. The implementation of the process within at least one wireless device 24 may be implemented consistent with the description provided herein to provide substantially the same functionality.

Figure 5:
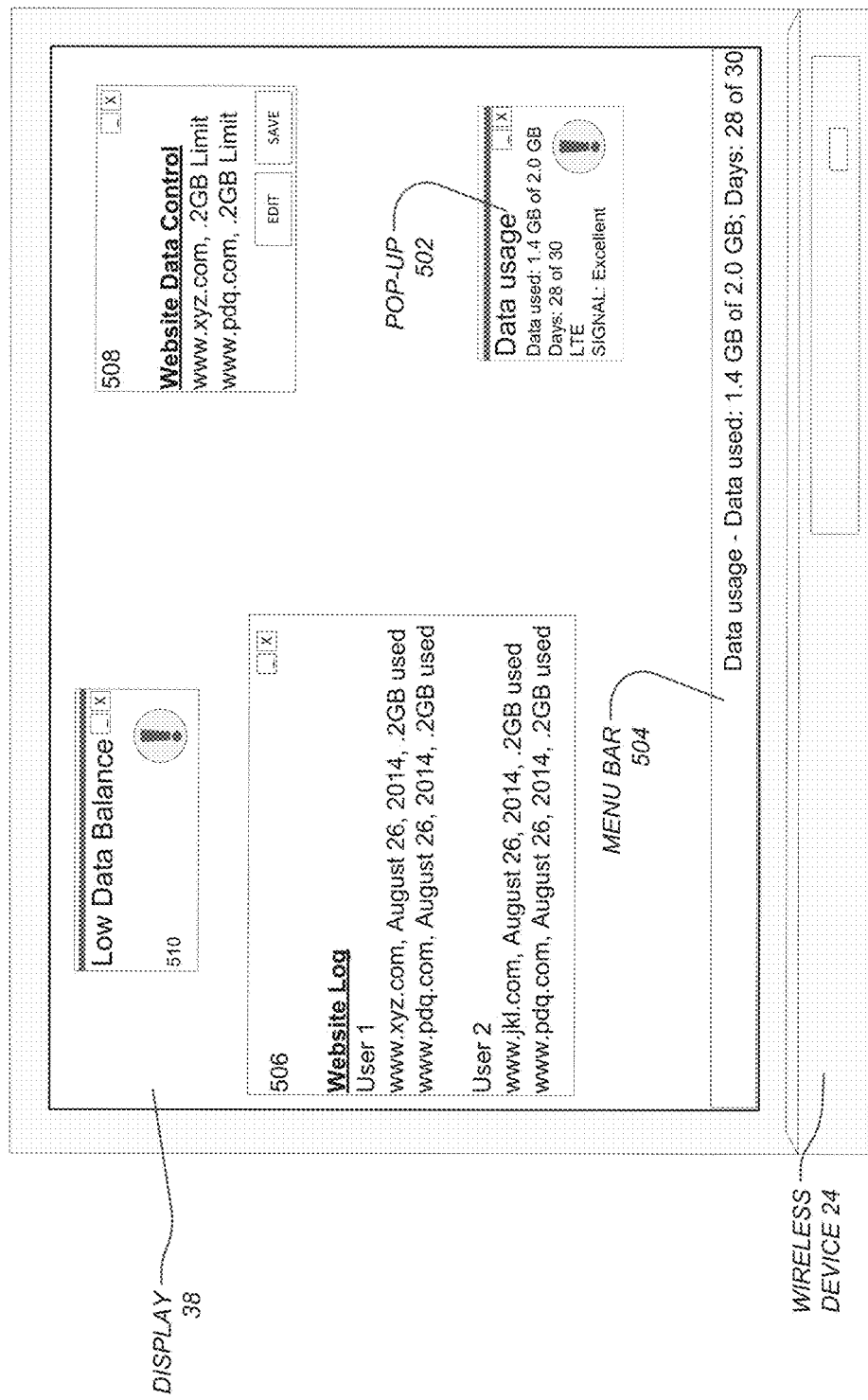
FIG. 5 shows a wireless device having a display for displaying data usage information and Internet resource tracking information.

FIG. 5 shows a wireless device having a display for displaying data usage information and Internet resource tracking information. In particular, FIG. 5 shows a wireless device 24 implementing various aspects of the invention. As shown in FIG. 5, data usage may be shown on the display 38 of the wireless device 24 in conjunction with process 202 and/or 208 of FIG. 3. In particular, data usage may be displayed as a pop-up 502. The pop-up 502 may include the amount of data used and the total amount of data originally available. The pop-up 502 may further include the number of days used along with the original number of days available. The pop-up 502 may further include the network type of connection (LTE) and the current signal strength ("Excellent"). It is contemplated that other information may be displayed in pop-up 502. Finally, the pop-up 502 may further include minimization and closing buttons.

The wireless device 24 may also or alternatively generate a menu bar 504. The menu bar 504 may include the amount of data used and the total amount of data originally available. The menu bar 504 may further include the number of days used along with the original number of days available. It is contemplated that other information may be displayed in the menu bar 504.

The wireless device 24 may further provide a website log 506. The website log 506 may list each user (user 1, user 2, . . . user n). For each user, the website log 506 may provide the Internet resource visited, the dates visited, and the amount of data used in visiting the particular Internet resource. It is contemplated that other information may be displayed in the website log 506. Finally, the website log 506 may further include minimization and closing buttons.

The wireless device 24 may further provide a website data control 508. The website data control 508 may receive input from the user on which Internet resources are to be monitored and the amount of data that can be utilized for using the particular Internet resource. For example, the user can enter a particular Internet resource and an amount of data that may be used using the edit and save buttons. It is contemplated that other information may be displayed in the website data control 508. Finally, the website data control 508 may further include minimization and closing buttons.

Additionally, they wireless device 24 may further provide a low data balance warning 510. The low data balance warning 510 may be generated as a pop-up when the amount reaches a particular level. Alternatively, the low data balance warning 510 may generated when the data is being consumed at a rate that will result in zero data prior to the end date of the data service.

Figure 6:
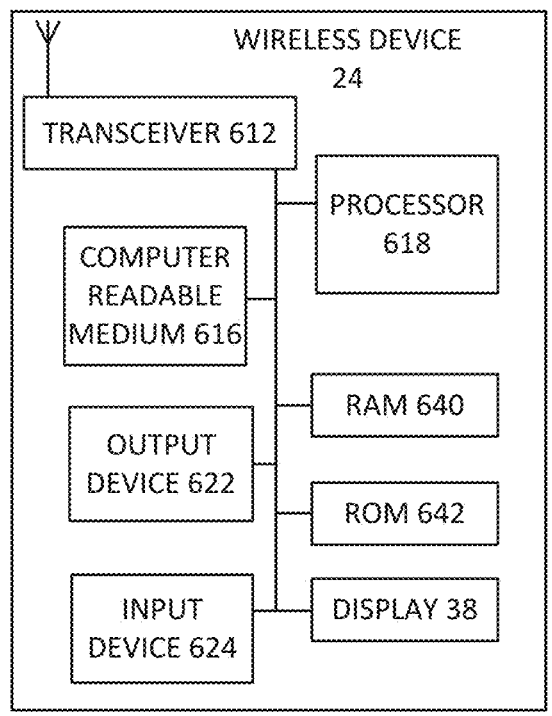
FIG. 6 shows a schematic of the wireless device shown in FIG. 5.

FIG. 6 shows a schematic of the wireless device shown in FIG. 5. The wireless device 24 may include a transceiver 612, a display 38, a computer readable medium 616, a processor 618, a random access memory 640, an output device 622, and input device 624, and a read-only memory 642. For the purposes of this disclosure, computer readable medium 616 stores computer data, which can include computer program code that is executable by the processor 618, in machine readable form. By way of example, and not limitation, the computer readable medium 616 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data.

In one or more aspects, the actions and/or events of a method, algorithm, or module providing the functionality shown in FIGS. 3, 4 and 5, for example only, may reside as one or any combination or set of codes and/or instructions (software) on a computer readable medium 616 or machine readable medium, which may be incorporated into a computer program product. The computer readable medium 616 may also be configured to store the values for the amount of wireless data service available, the amount of wireless data service used, how many days of wireless service have been used, how many days of wireless service remaining, and the like. The computer readable medium 616 may also store how much data was used for each domain, web address, wireless device application, or other web resource during a given time period, such as, for example, one billing cycle. The above-noted software may be preinstalled in the wireless device 24, may be downloaded from an Internet resource, may be installed from a physical disk, may be installed from the wireless access point 10 or the like.

Further in accordance with various aspects of the invention, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

The invention may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A wireless access point configured to connect to a wireless device, the wireless device comprising:
   a wireless device processor configured to receive wireless service information comprising at least one of the following: prepaid data usage by the wireless access point or an amount of prepaid data usage available from the wireless access point;
   a wireless device transceiver configured to connect to the wireless access point and to transfer data to and from the wireless access point; and
   a wireless device display configured to display the wireless service information comprising at least one of the following: the prepaid data usage by the wireless access point or the amount of prepaid data usage available from the wireless access point;
   the wireless access point comprising:
   at least one access point transceiver configured to connect to the wireless device and to transfer data to and from the wireless device;
   the at least one access point transceiver further configured to connect to a third party mobile network operator network to transfer data to and from the third party mobile network operator network;
   a metering client configured to activate the wireless access point in response to identification and confirmation of use of a tracking system to a metering system implemented by a mobile virtual network operator;
   the metering client configured to determine with an accounting unit the wireless service information comprising at least one of the following: the prepaid data usage by the wireless access point or the amount of prepaid data usage available from the wireless access point;
   the metering client further configured to determine when the amount of prepaid data usage available has been depleted to zero with the accounting unit; and
   the metering client further configured to limit operation of the wireless access point to transfer data to and from the third party mobile network operator network when the amount of prepaid data usage available has been depleted to zero.

2. The system according to claim 1
   wherein the wireless device transceiver is configured to connect to the wireless access point and to receive from the accounting unit of the wireless access point the wireless service information comprising at least one of the following: the prepaid data usage by the wireless access point or the amount of prepaid data usage available from the wireless access point,
   wherein the accounting unit is configured to establish an account with a representation of prepaid funds for data usage purchased by a user for the wireless access point to transfer data to and from the third party mobile network operator network, and
   wherein the accounting unit is configured to determine the amount of prepaid data usage available by deducting from the data usage purchased by a user for the wireless access point an amount of data transferred to and from the third party mobile network operator network.

3. The system according to claim 1 wherein the wireless access point comprises a display configured to display the wireless service information comprising at least one of the following: the prepaid data usage by the wireless access point or the amount of prepaid data usage available from the wireless access point.

4. The system according to claim 1
   wherein the wireless access point is configured to log a given domain, a web address, or other Internet resource that the wireless access point utilizes to transfer data to and from the third party mobile network operator network; and
   the wireless device processor is further configured to obtain the given domain, the web address, or the other Internet resource that the wireless access point has logged.

5. The system according to claim 4
   wherein the wireless access point further comprises a wireless access point display configured to display the wireless service information comprising at least one of the following: the prepaid data usage by the wireless access point or the amount of prepaid data usage available from the wireless access point; and
   wherein the display is further configured to display the given domain, the web address, or the other Internet resource that the wireless access point utilizes to transfer data to and from the third party mobile network operator network.

6. The system according to claim 1
   wherein the wireless access point further comprises a wireless access point display configured to display the wireless service information comprising at least one of the following: the prepaid data usage by the wireless access point or the amount of prepaid data usage available from the wireless access point; and
   wherein the wireless access point further comprises a wireless access point processor configured to receive addresses of Internet resources that a user desires limited usage.

7. The system according to claim 6 wherein the wireless access point processor is further configured to direct the limited usage of the Internet resources by the wireless access point based on the addresses of Internet resources that the user desires limited usage.

8. The system according to claim 1
   wherein the wireless access point further comprises a wireless access point display configured to display the amount of prepaid data usage available by the wireless access point to transfer data to and from the third party mobile network operator network;
   wherein the wireless access point is configured to determine if data is being consumed faster than a default rate; and
   wherein the wireless device processor is further configured to obtain an indication from the wireless access point that data is being consumed faster than a default rate.

9. The system according to claim 8 wherein the wireless device display is further configured to display an indication that data is being consumed faster than a default rate.

10. The system according to claim 1 wherein the display is further configured to display the wireless service information in one of the following: a web page, pop-up window, or menu bar.

11. A process of operating a wireless access point that connects to a wireless device comprising:
    connecting the wireless access point to the wireless device and transferring data to and from the wireless access point to a wireless device transceiver;
    activating the wireless access point in response to identification and confirmation of use of a tracking system to a metering system implemented by a mobile virtual network operator;
    connecting a wireless access point transceiver to a third party mobile network operator network to transfer data to and from the third party mobile network operator network;
    determining with a metering client with an accounting unit wireless service information comprising at least one of the following: prepaid data usage by the wireless access point or an amount of prepaid data usage available from the wireless access point;
    transmitting from the wireless access point to the wireless service information comprising at least one of the following: the prepaid data usage by the wireless access point or the amount of prepaid data usage available from the wireless access point;
    displaying on a display of the wireless access point the wireless service information comprising at least one of the following: the prepaid data usage by the wireless access point or the amount of prepaid data usage available from the wireless access point;
    determining with the metering client when the amount of prepaid data usage available has been depleted to zero with the accounting unit; and
    limiting with the metering client an operation of the wireless access point to transfer data to and from the third party mobile network operator network when the amount of prepaid data usage available has been depleted to zero.

12. The process according to claim 11 further comprising connecting to the wireless access point and receiving from the accounting unit of the metering client the wireless service information comprising at least one of the following: the prepaid data usage by the wireless access point or the amount of prepaid data usage available from the wireless access point,
    wherein the accounting unit is configured to establish an account with a representation of prepaid funds for data usage purchased by a user for the wireless access point to transfer data to and from the third party mobile network operator network, and
    wherein the accounting unit is configured to determine the amount of prepaid data usage available by deducting from the data usage purchased by a user for the wireless access point an amount of data transferred to and from the third party mobile network operator network.

13. A process according to claim 11 further comprising: displaying on a display of the wireless access point the wireless service information comprising at least one of the following: the prepaid data usage by the wireless access point or the amount of prepaid data usage available from the wireless access point.

14. The process according to claim 11 further comprising:
    logging in the wireless access point a given domain, a web address, or other Internet resource that the wireless access point utilizes to transfer data to and from the third party mobile network operator network; and
    transmitting to a processor of the wireless device the given domain, the web address, or the other Internet resource that the wireless access point has logged.

15. The process according to claim 14 further comprising displaying on a wireless access point display the wireless service information comprising at least one of the following: the prepaid data usage by the wireless access point or the amount of prepaid data usage available from the wireless access point; and
    displaying the given domain, the web address, or the other Internet resource that the wireless access point utilizes to transfer data to and from the third party mobile network operator network on the display.

16. The process according to claim 11 further comprising displaying on a wireless access point display the wireless service information comprising at least one of the following: the prepaid data usage by the wireless access point or the amount of prepaid data usage available from the wireless access point; and
    receiving addresses of Internet resources that a user desires limited usage.

17. The process according to claim 16 further comprising limiting usage of the Internet resources by the wireless access point based on the addresses of Internet resources that the user desires limited usage.

18. The process according to claim 11 further comprising:
    displaying on a wireless access point display the wireless service information comprising at least one of the following: the prepaid data usage by the wireless access point or the amount of prepaid data usage available from the wireless access point;
    determining with the wireless access point if data is being consumed faster than a default rate; and
    obtaining an indication from the wireless access point that data is being consumed faster than a default rate.

19. The process according to claim 18 further comprising displaying an indication that data is being consumed faster than a default rate.

20. The process according to claim 11 wherein the displaying comprises displaying the wireless service information in one of the following: a web page, pop-up window, or menu bar.

* * * * *